(12) United States Patent
Sorter et al.

(10) Patent No.: US 6,729,133 B1
(45) Date of Patent: May 4, 2004

(54) HEAT TRANSFER SYSTEM FOR A CO-GENERATION UNIT

(75) Inventors: Richard L. Sorter, Verdi, NV (US); Gerald H. Dorn, Reno, NV (US)

(73) Assignee: Chapeau, Inc., Granite Bay, CA (US)

( * ) Notice: Subject to any disclaimer, the term of this patent is extended or adjusted under 35 U.S.C. 154(b) by 0 days.

(21) Appl. No.: 10/356,826

(22) Filed: Feb. 3, 2003

(51) Int. Cl.[7] ................................. F02B 59/04
(52) U.S. Cl. ..................... 60/599; 123/563; 123/41.29
(58) Field of Search .................. 60/599, 618; 123/563, 123/41.29, 41.42, 41.44

(56) References Cited

U.S. PATENT DOCUMENTS

| | | | |
|---|---|---|---|
| 3,134,371 A | * 5/1964 | Crooks | 123/563 |
| 3,228,189 A | * 1/1966 | Baker | 60/618 |
| 3,483,854 A | * 12/1969 | Collingwood et al. | 123/563 |
| 3,662,722 A | 5/1972 | Sarto | |
| 3,752,132 A | * 8/1973 | Bentz et al. | 123/563 |
| 4,000,725 A | * 1/1977 | Harris | 123/563 |
| 4,106,287 A | 8/1978 | Auclair et al. | |
| 4,565,175 A | * 1/1986 | Kaye | 123/563 |
| 4,697,551 A | * 10/1987 | Larsen et al. | 123/563 |
| 5,394,854 A | * 3/1995 | Edmaier et al. | 123/563 |
| 5,875,633 A | * 3/1999 | Lawson, Jr. | 60/618 |
| 6,125,801 A | 10/2000 | Mendler | |
| 6,164,063 A | 12/2000 | Mendler | |
| 6,457,442 B1 | * 10/2002 | Fuchs et al. | 123/41.29 |
| 6,467,257 B1 | 10/2002 | Khair et al. | |

* cited by examiner

Primary Examiner—Thomas Denion
Assistant Examiner—Thai Ba Trieu
(74) Attorney, Agent, or Firm—Lee G. Meyer, Esq.

(57) ABSTRACT

A heat exchange cooling system for an internal combustion engine co-generation plant, which allows exhaust recycled gas combustion while maintaining lower head temperatures to reduce thermal $NO_x$ emissions while delivering increased process/utility heat to a proximate co-generation client, is provided. The cooling system has two cooling loops with different flow rates: one through the engine and the second through exhaust manifolds, such that higher engine block flow resulting in cooler head temperatures is provided, while allowing higher temperature coolant to flow through exhaust exchangers, such that when the two coolant flows converge at a process/utility heat exchanger for heating co-generation client liquid, the combined flows substantially increase the transferred heat. In another embodiment, a separate intercooler circuit is used to cool the compressed intake charge containing the recycled gas prior to entry into the intake engine manifold to further reduce head temperatures and control thermal $NO_x$ emissions.

20 Claims, 3 Drawing Sheets

HEAT TRANSFER SYSTEM FOR A CO-GENERATION UNIT

BACKGROUND OF THE INVENTION

1. Field of the Invention

The present invention relates generally to heat transfer systems for co-generation units; and, more particularly, to heat transfer and cooling systems for internal combustion engine driven co-generation units.

2. Description of Related Art

Electric energy generation in this country has lagged behind demand. There are a number of reasons for this, but chief among them is failure of traditional energy producers to replace spent units and capitalize new plants. This has been, in part, due to increased air quality regulations. In addition new challenges face electric generation-security. Events of Sep. 11, 2001 showed this nation its vulnerability to terrorist attack. Vital operations, such as police, medical and civil defense that relied upon the electric power "grid" for service, realized that their needs were susceptible to disruption and viewed stand-alone units as well as micro grids as a possible solution. These alternatives are fraught with their own problems. Chief among the reasons is a drastic increase in demand. Thus, while energy demand has increased, generating capabilities have not.

One reason for the growth in demand is the increased use of computers and other technology for industrial and business purposes, as well as personal use. As computer usage continues to grow, the use of power-consuming peripheral technologies, such as printers, cameras, copiers, photo processors, servers, and the like, keep pace and even expand. As business use of computer based equipment continues to rise, as do the number of in-house data servers, outsourced data storage facilities, financial systems, and Internet-related companies requiring constant electrical uptime and somewhat reducing traditional peak demand times, requirement for reliable, cheap, environmentally compliant electrical power continues to grow.

Other technological advances have also increased electrical energy demand. Increased use of power consuming devices in every aspect of life from medical to industrial manufacturing robots, as well as innovations in almost every research and industrial field are supported by increasingly complex technology, which requires more electrical power to function. CAT scans, NMRs, side looking X-rays, MRIs and the like all take electrical power.

As a result, the Federal Government deregulated power generation, and a number of states have begun to establish competitive retail energy markets. Unfortunately, the deregulation process has not provided adequate incentives for industry entities to construct generating facilities, upgrade the transmission grid, or provide consumers with price signals to enable intelligent demand-side management of energy consumption. With the deregulation in the utility market, energy (kWh) has become a commodity item that can be bought or sold. However, swings in supply and demand leave end users open to fluctuations in the cost of electricity.

According to the ETA, to meet projected increases in demand over the next 20 years, at least 393 GW of additional generating capacity must be added. In some areas, the growth in demand is much higher than the projected two percent average (e.g., California's peak electricity demand grew by 18 percent between 1993 and 1999, while generating capacity increased by only 0.3 percent.) Despite California's highly publicized energy situation, a similar problem exists for other states as well; the New York Independent System Operator recently stated that 8600 MW of additional generating capacity (a 25 percent increase) must be added by 2005 to avoid widespread shortages that may lead to blackouts.

In addition to the mismatch between demand and generating capacity, the physical transmission infrastructure necessary to deliver power from geographically remote generating facilities to the consumer's location is unable to support the increased load. Even under today's operating conditions, the transmission grid is subject to stress and occasional failure.

Additionally, security and reliability of source has become of increasing concern. Vulnerability of grid systems and blackouts have become more commonplace. Strategic industries are looking to cut energy costs, increase reliability, and assure security. This has lead to an interest in distributed market technologies. The potential market for distributed generation has become vast without adequate means for fulfilling this need. Again, inefficiency, reliability, and environmental concerns are major barriers. The compelling economics are made on engine efficiency without the financial benefit of waste heat usage, yet with all of the same customer reluctance to accept hassles. Industry estimates indicate that the existing market for distributed generation is $300 billion in the United States and $800 billion worldwide.

The need to leverage existing technology while transitioning to alternative energy sources is an important driver for meeting this challenge. Although most existing distributed generation sites use small gas turbine or reciprocating engines for generation, there are many alternatives that are being considered over the longer term. Technologies, such as micro turbines, are currently available, but only used at a relatively small number of sites. These newer generators offer some inherent advantages, including built-in communications capabilities. It is anticipated that fuel cells will be available in the next five years, which will provide some highly appealing, environmentally friendly options.

As it stands today however, small gas turbine and reciprocating engines comprise a substantial proportion of existing generator technology in the market and will for some time to come for a number of reasons. Engines provide the best conversion efficiency (40%), and they can operate using non-pressurized gas. Micro turbines, on the other hand, require compressed gas and conversion efficiency is lower (approximately 30%). These latter generators tend to be used in wastewater and landfill and other specialty sites, where a conventional prime mover is unable to stand up to poor fuel quality. Therefore, for utilities to truly benefit from a distributed generation scheme over the short term, they must look to the existing generator technology to provide a sustainable and affordable solution.

Waste heat utilization or co-generation is one way to meet this challenge. In the case of power generation, the waste heat is not used, and the economics are based largely on the cost of the electricity produced (i.e. heat rate is paramount), with little consideration for improved reliability or independence from the electric grid. The anticipated fluctuation in energy costs, reduced reliability, and increasing demand has led end users to consider maximizing efficiency through use of heat from generation of on-site generating-heat capture systems, i.e. co-generation, or "Combined Heating and Power" (CHP).

Co-generation of electricity and client process/utility service heat to provide space heating and/or hot water from the same unit is one solution. Co-generation provides both electricity and usable process or utility heat from the formerly wasted energy inherent in the electricity generating process. With co-generation, two problems are solved for the price of one. In either case, the electricity generation must meet stringent local air quality standards, which are typically much tougher than EPA (nation wide) standards.

On-site co-generation represents a potentially valuable resource for utilities by way of distributed generation. A utility can increase capacity by turning to a "host" site (e.g. industrial user) with an existing generator, and allow them to parallel with the grid and use their generator capacity to handle peak volumes. From the utility's point of view, the key advantages to a distributed generation solution are twofold: improved system reliability and quality; and the ability to defer capital costs for a new transformer station.

For customers who can use the process/utility waste heat, the economics of co-generation are compelling. The impediment to widespread use is reliability, convenience, and trouble-free operation. Co-generation products empower industrial and commercial entities to provide their own energy supply, thus meeting their demand requirements without relying on an increasingly inadequate public supply and infrastructure.

Unfortunately, to date, the most widespread and cost-effective technologies for producing distributed generation and heat require burning hydrocarbon-based fuel. Other generating technologies are in use, including nuclear and hydroelectric energy, as well as alternative technologies such as solar, wind, and geothermal energy. However, burning hydrocarbon-based fuel remains the primary method of producing electricity. Unfortunately, the emissions associated with burning hydrocarbon fuels are generally considered damaging to the environment, and the Environmental Protection Agency has consistently tightened emissions standards for new power plants. Green house gases, as well as entrained and other combustion product pollutants, are environmental challenges faced by hydrocarbon-based units.

Of the fossil fuels, natural gas is the least environmentally harmful. Most natural gas is primarily composed of methane and combinations of Carbon Dioxide, Nitrogen, Ethane, Propane, Iso-Butane, N-Butane, Iso-Pentane, N-Pentane, and Hexanes Plus. Natural gas has an extremely high octane number, approximately 130, thus allowing higher compression ratios and broad flammability limits. A problem with using natural gas is reduced power output when compared to gasoline, due mostly to the loss in volumetric efficiency with gaseous fuels. Another problem area is the emissions produced by these natural gas engines. Although, the emissions are potentially less than that of gasoline engines, these engines generally require some types of emissions controls such as exhaust gas re-circulation (EGR), positive crankcase ventilation (PCV), and/or unique three-way catalyst. A still another problem with using natural gas is the slow flame speed, which requires that the fuel be ignited substantially before top dead center (BTDC). In general, most internal combustion engines, running on gasoline, operate with a spark advance of approximately 35° F. BTDC; where as, the same engine operating on natural gas will require an approximate advance of 50° F. BTDC. The slower burn rate of the fuel results in reduced thermal efficiency and poor burns characteristics. Never the less natural gas fueled engines provide a valuable power source for distributed generation.

Internal combustion engines utilized for combined heat and power are designed so that engine coolant from the radiator passes through a process/utility heat exchanger so the heat from combustion can be transferred to a co-generation client. Prior art co-generation systems employing internal combustion engines, and specifically, natural gas fueled engines have suffered from the myriad of problems including elevated head temperatures and inability to deliver large quantities of process and/or utility heat to the co-generation client. Excessive head temperatures lead to inefficient operation and unacceptable environmental conditions, which include excessive use of fuel as well as significant thermal $NO_x$ production.

It is well known that emission reduction for natural gas engines can be accomplished by recycling of exhaust gases to make the engines "run lean." Numerous systems have been devised to recycle exhaust gas into the fuel-air induction system of an internal combustion engine for the purposes of pre-heating the air-fuel mixture to facilitate its complete combustion in the combustion zone, for re-using the unignited or partially burned portions of the fuel which would otherwise pass to exhaust and into the atmosphere, and for reducing the oxides of nitrogen emitted from the exhaust system into the atmosphere. It has been found that approximately 15 to 20 percent exhaust gas recycling is required at moderate engine loads to substantially reduce the nitrogen oxide content of the exhaust gases discharged in the atmosphere, that is, to below about 1,000 parts per million.

Although the prior art systems have had the desired effect of reducing nitrogen oxides in the exhaust by reducing the maximum combustion temperature as a consequence of diluting the fuel-air mixture with recycled exhaust gases during certain operating conditions of the engine, these systems have not been commercially acceptable from the standpoints of both cost and operating efficiency and have been complicated by the accumulation of gummy deposits which tend to clog the restricted bypass conduit provided for recycling the exhaust, and have also been complicated by the desirability of reducing the recycling during conditions of both engine idling when nitrogen oxide emission is a minor problem and wide open throttle when maximum power is required, while progressively increasing the recycling of exhaust gases with increasing engine load at part open throttle.

The nitrogen oxide emission is a direct function of combustion temperature, and for that reason is less critical during engine idling when the rate of fuel combustion and the consequent combustion temperature are minimal but tends to be problematic during throttle up and extended full speed operation. In the usual hydrocarbon fuel type engine, fuel combustion can take place at about 1,200° F. The formation of nitrogen oxides does not become particularly objectionable until the combustion temperature exceeds about 2,200° F., but the usual engine combustion temperature, which increases with engine load or the rate of acceleration at any given speed frequently, rises to about 2,500° F. It is known that the recycling of at least one-twentieth and not more than one-fourth of the total exhaust gases through the engine, depending on the load or power demand, will reduce the combustion temperature to less than 2,200° F. Contaminants in the exhaust resulting from fuel additives desired for improved combustion characteristics normally exist in a gaseous state at combustion temperatures exceeding about 1,700° F., but tend to condense and leave a gummy residue that is particularly objectionable at the location of metering orifices and valve seats in the exhaust recycling or bypass conduit.

Thus, natural gas fired internal combustion driven co-generation systems have previously suffered from one or more disadvantages. Specifically, the EGR system did not recycle exhaust gas to the intake engine manifold at sufficiently low temperature to foster low cylinder head temperatures. Simultaneously, turbo charged fuel systems, because of the compression, increased intake fuel manifold temperatures causing the same affect. Additionally, engine-cooling systems were not efficient enough to remove substantial engine heat from the cooling fluid while maintaining an inlet temperature of the coolant sufficient to reduce head temperatures to an acceptable level. This in turn reduced the heat, which was transferred to the co-generation client. However, increasing coolant flow through the engine increases parasitic load decreasing efficiency. The result was a rich burning engine, i.e. inefficient, with substantial thermal $NO_x$ production, violating air emission standards, while not providing sufficient heat transfer to the process/heat co-generation loop to be worthwhile.

A further drawback was that recycling exhaust gas increased the intake air temperature and, therefore, increased the head temperature. This is particularly true when the inlet gas is supercharged. This combination of disadvantages made natural gas fueled, internal combustion driven co-generation systems an unacceptable candidate for client based distributed generation complexes.

It would be, therefore, advantageous to have a system, which reduced fuel consumption, as well as $NO_x$ production while delivering substantial heat to the process/utility heat co-generation system. In addition, it would be advantageous to run a lean burning engine using recycled exhaust gas, which results in not only a lean burn but also reduced head temperatures leading to reduces thermal emissions and greater efficiency.

SUMMARY OF THE INVENTION

It has now been unexpectedly discovered that a system for engine cooling and effective heat transfer to a co-generation client, reduces engine head temperature thereby reducing fuel consumption and reducing pollutants, as well as delivering substantially increased heat to a co-generation process/utility heat facility. The cooling cycles and process/utility heat radiation configurations of the inventive system maintain cylinder inlet temperature resulting in improved efficiency, reduced thermal $NO_x$ and longer engine life. This allows operation of the engine at optimum inlet and outlet temperatures regardless of co-generation process/utility heat system requirements, without excessive parasitic pump loads.

In accordance with the invention, a split flow engine cooling system includes a first coolant loop which directs coolant through the engine block, and a second loop which directs coolant through the at least one exhaust manifold in cooperation with the first loop, such that the coolant inlet temperature of the first loop is substantially reduced to maintain appropriate engine head temperatures to reduce thermal $NO_x$ while maintaining efficiency. The two loops then merge at a process heat exchanger such that the combined output heat contained in the liquid of the two loops is effective to deliver increased heat to the co-generation process/utility heat system without an increase in parasitic load, i.e. using the engine internal pump only.

Advantageously, the coolant loops each carry different quantities of coolant to assure engine performance. In one embodiment, the loops can be balanced by means of a dynamic feed back valving to assure head temperatures within a specified range.

In accordance with another aspect of the instant invention, a turbo intercooler heat exchanger is used to reduce the temperature of compressed engine intake gas, emerging from the turbocharger, prior to its entry into the intake manifold of the engine such that the inlet gas temperature is reduced to retard the formation of thermal $NO_x$. Thus the engine driven coolant pump can be utilized exclusively for the coolant loop, reducing the parasitic load, while drastically reducing cylinder inlet temperature resulting in improved efficiency, lower thermal $NO_x$ and longer engine life.

In another aspect an EGR cooling circuit using air finned heat exchangers is used to reduce the temperature of the recycled exhaust gas, prior to its mixing with the intake gases for combustion. This further reduces cylinder inlet temperature resulting in improved efficiency, lower thermal $NO_x$, and longer engine life.

In accordance with the invention a dump/balance radiator is used to remove heat not transferred to the co-generation process/utility heat system such that engine efficiency is maintained even in the absence of the co-generation process/utility heat system load.

BRIEF DESCRIPTION OF THE DRAWINGS

The following drawings form part of the present specification and are included to further demonstrate certain embodiments. These embodiments may be better understood by reference to one or more of these drawings in combination with the detailed description of specific embodiments presented herein.

DETAILED DESCRIPTION OF THE PREFERRED EMBODIMENTS

Figure 1:
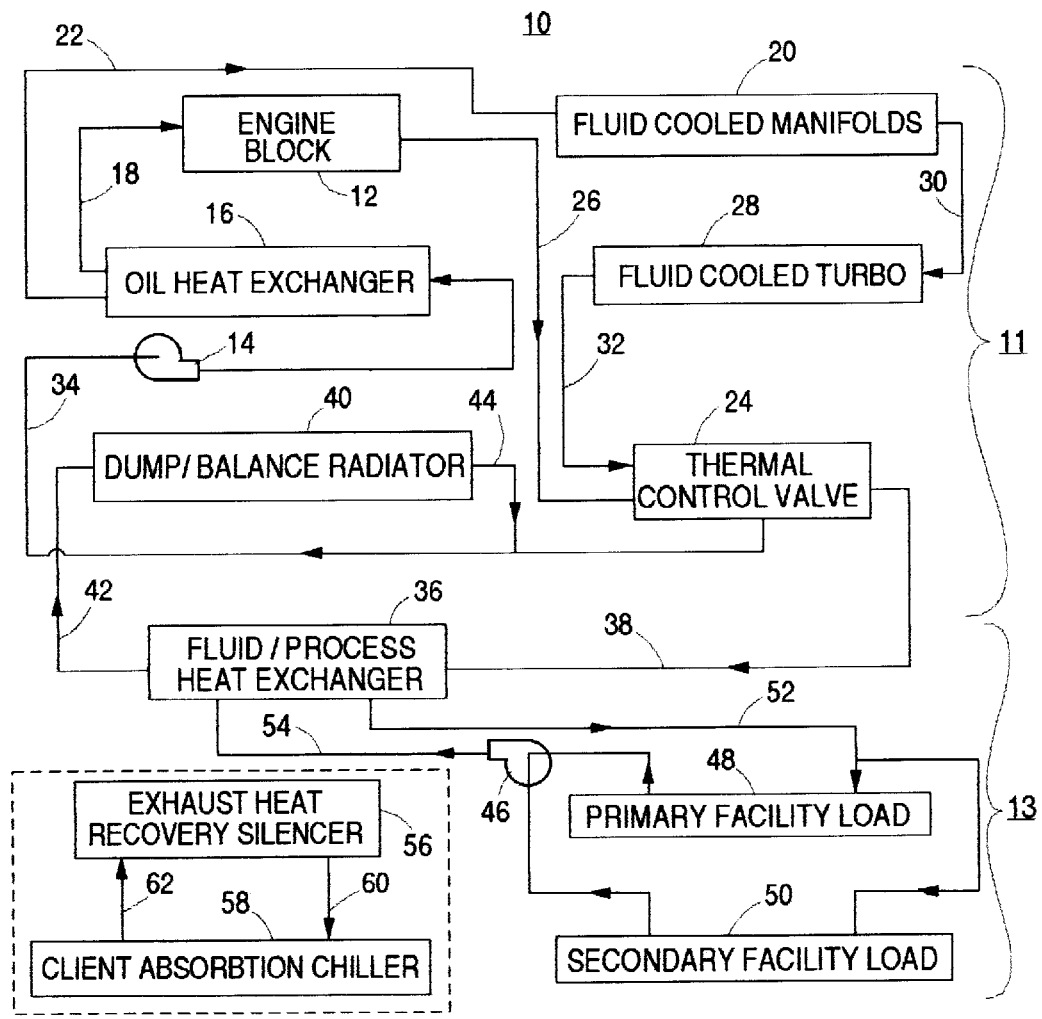
FIG. 1 is a flow chart of the heat transfer systems for co-generation of the instant invention.

In accordance with the instant invention a natural gas fueled, internal combustion engine, employing exhaust gas recycle (EGR), delivers power to spin a coupled electric turbine, as well as heat of combustion, through a heat exchanger, to a co-generation process/utility heat loop for on site use as heat for process water, utility heat, space heat, potable hot water and the like. This is accomplished with the instant system by increasing the transfer of engine heat to the co-generation process/utility heat loop while maintaining the engine, and especially the head temperature low enough to increase efficiency and reduce thermal $NO_x$ to acceptable levels, even in the presence of the recycled exhaust gas. This is accomplished with substantially no increase in parasitic power requirements, such as adding external pumps to increase the flow through the heat exchanger.

In accordance with the invention an engine coolant loop flow is split so that a first portion flows through the engine block, by way of the engine oil cooler, and through a thermal valve control to the fluid process heat exchanger. A second portion flows to at least one fluid cooled exhaust manifold by way of the engine oil cooler, for example, through the inlet ports of the left and right liquid cooled exhaust manifolds and then the inlet port of the fluid cooled turbocharger where it merges with the liquid from the first loop prior to going through the fluid process heat exchanger, which delivers heat to the co-generation process/utility heat system.

Thus, in accordance with one embodiment, the coolant flows through a cooling loop by way of an engine driven pump through the oil heat exchanger. Exiting the oil heat exchanger it splits into two parallel loops. One loop follows a path through the engine block and the other through the coolant manifold, and then the coolant cooled turbo-charger. Both coolant flow loops converge at the thermal control valve where they blend back together to form a single stream prior to flowing through the fluid process heat exchanger. The thermal control valve senses the blended stream temperature and by-passes the fluid process heat exchanger if the temperature is below the threshold engine block inlet temperature of, for example, 175° F. This closed loop prohibits flow through the fluid/process heat exchanger and dump/balance radiator to retard heat loss until optimum engine block inlet temperature is achieved. When the temperature is greater than, for example, 175° F., flow through the control valve is first diverted partially to the fluid/process heat exchanger and then fully to the fluid/process heat exchanger as operating temperatures are reached.

The combined flow is, thus, through the coolant/process heat exchanger for use in heat exchange with the co-generation process/utility heat system. This parallel cooling loop increases the engine cooling loop heat available to the process/utility heat system, significantly, while maintaining favorable engine operating conditions. For example, the system of instant invention can maintain engine block outlet temperature of 198° F. instead of the typical 210° F. of comparable engine designs, while heat delivered to the process/utility co-generation system increased from a typical 780,000 BTU/hour to 1,100,000 BTU/hour. Flow through system is nominally 106 GPM with a differential of 20° F. across the engine block. In this manner the coolant through the second loop is at a higher temperature, but a lower flow rate, while the coolant through the first is at a slightly lower temperature, but a higher flow rate to keep the cylinder heads cooler, thus, increasing efficiency and reducing thermal $NO_x$ emissions.

In accordance with a further aspect, the system employs a separate loop to cool supercharged engine inlet feed. This separation of the intercooler liquid coolant loop from the engine coolant loop provides a separate heat exchanger upstream of the engine intake manifold to reduce engine intake temperatures, drastically reducing head temperatures within the engine. Likewise, in a further aspect the exhaust recycle gas is cooled by at least one air cooled radiator prior to admixing it with air and fuel which is then compressed in the supercharger.

The power source compatible with the instant invention is a natural gas fueled, internal combustion liquid cooled engine, wherein at least a portion of the exhaust gas is recycled to reduce $NO_x$. For example a Deutz brand Engine Model BE 8 M1015 GC engine manufactured by Deutz. The natural gas fired internal combustion engine is the prime mover of the electrical generation system, having liquid coolant flow system required return coolant at a temperature to the engine to reduce head temperature to less than about 1800° F. The internal engine pump moves the coolant through the various engine components and then through the process heat exchanger to transfer heat to the co-generation process/utility the system.

Turning to the drawing, there is shown in FIG. 1, the system 10, in accordance with the instant invention. An engine block 12 contains fluid cooling ports through which cooling fluid travels by means of internal fluid pump 14 located upstream of oil heat exchanger 16, which is ideally housed within the engine. As shown, oil heat exchanger 16 is in fluid communication with the inlet port of engine block 12 by means of conduit 18 and with inlet of fluid cooled manifold 20 by means of conduit 22. Preferably, oil heat exchanger 16 is contained within engine block 12 and is an integral part thereof. The outlet of engine block 12 communicates with the inlet of thermal control valve 24 by means of conduit 26.

The outlet of fluid cooled manifold 20 communicates with the inlet of fluid cooled turbocharger manifold 28 by means of conduit 30. The outlet of fluid cooled turbocharger manifold 28 communicates with a second inlet of thermal control 24 through conduit 22. In a bypass circuit for engine warm up, the outlet of thermal control valve 24 communicates through internal fluid pump 14 with oil heat exchanger 16 through conduit 34. Alternately, during operation thermal control valve 24 communicates through internal fluid pump 14 with oil heat exchanger 16 by way of fluid process/heat exchanger 36 via conduit 38 and dump/balance radiator 40 via conduit 42 and then a T connect of conduit 44 with conduit 34.

Figure 2:
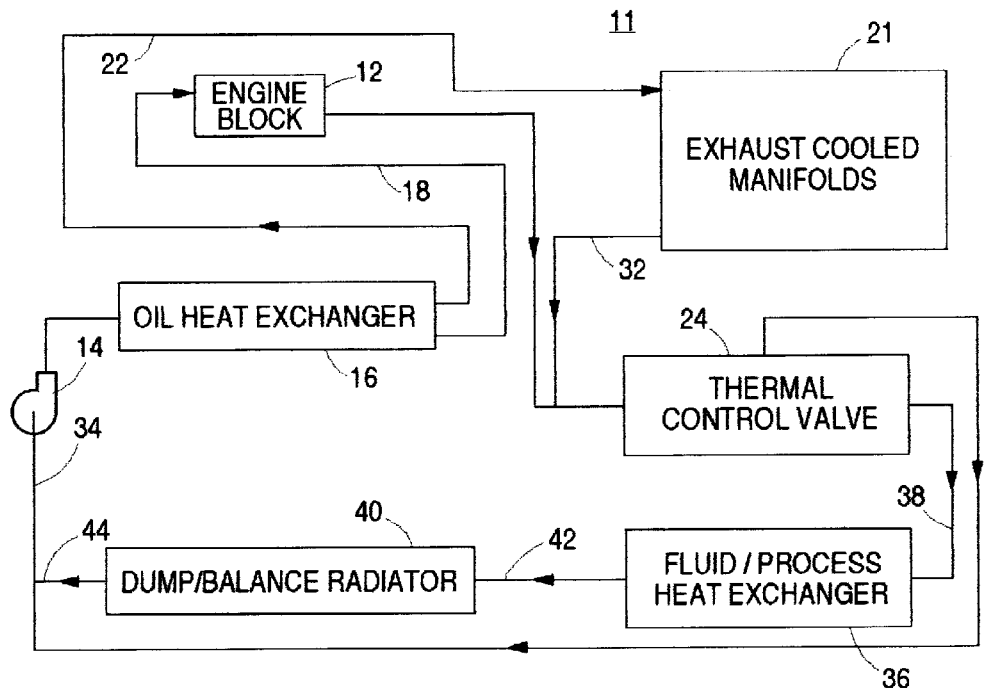
FIG. 2 is a flow chart of the engine cooling loop of the heat transfer systems for co-generation of the instant invention.

As better seen in FIG. 2, this fluid loop comprises the coolant system 11 of the present invention. In operation, internal fluid pump 14 is driven by engine block 12 to flow coolant at a temperature of about 175° F. and a flow rate of about 106 GPM through oil heat exchanger 16 and simultaneously through conduit 18 to the inlet of engine block 12 at a temperature of about 182° F. and a flow rate of about 91 GPM and conduit 22 at a temperature of about 182° F. and a flow rate of about 26 GPM to inlet of exhaust-cooled manifolds 21.

The exhaust-cooled manifolds 21 comprise the initial fluid cooled manifold 20 and the fluid cooled turbocharged manifold 28 as shown in FIG. 1., but can consist of one or more liquid cooled manifolds for removing heat from the engine exhaust. In accordance with the invention, these manifolds may comprise a single unit as shown in FIG. 2 or separate units shown in FIG. 1. The function of these manifolds is to cool exhaust and generate heat to the cooling fluid, which will be transferred to the co-generation client as described below.

Coolant exiting from exhaust-cooled manifold 21 at a temperature of about 210° F. and a flow rate of about 26 GPM, flows to thermal control valve 24, which functions to limit fluid circulation back to inlet of the engine block 12 until operating temperature of the system is attained, and thereafter through conduit 38 to fluid process/heat exchanger 36. Coolant exiting from engine block 12 at a temperature of about 198° F. and a flow rate of about 91 GPM, flows to thermal control valve 24 where is merges with the coolant from exhaust-cooled manifold 21. Dump/balance radiator 40 serves as a cooling radiator for the system to balance coolant inlet temperature to the oil heat exchanger 16 if fluid process/heat exchanger 36 removes insufficient heat or is turned off.

Returning to FIG. 1, fluid process/heat exchanger 36 is a radiator which allows heat transfer from coolant system 11

Figure 3:
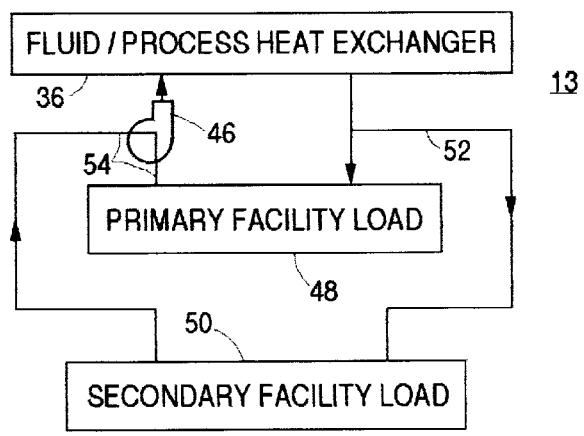
FIG. 3 is a flow chart of the co-generation process/utility heat delivery loop of the instant invention.

(see FIG. 2) to co-generation process/utility heat system 13, as seen in detail in FIG. 3. Co-generation process/utility system comprises a closed loop to circulate fluid, which is heated in fluid process/heat exchanger 36, by means of pump 46. Fluid process/heat exchanger 36 communicates with primary facility load 48 and secondary facility load 50 by means of conduit 52 and return conduit 54.

In operation, fluid process/heat exchanger 36 which contains coolant fluid at a temperature of about 206° F. at a flow rate of about 106 GPM, provides heat exchange between coolant system 11 and co-generation process/utility heat system 13, which provides heated liquid to the client in a co-generation configuration. Thus, the co-generation client receives transferred heat from the coolant system 11 by way of fluid process/heat exchanger 36 to the co-generation process/utility heat system 13. The coolant in coolant system 11 is then heat balanced, if necessary, in the dump/balance radiator 40 to return through internal fluid pump 14 to oil heat exchanger 16 to loop at a temperature of about 175° F. at a flow rate of about 106 GPM.

Thus, for example heat in coolant flow, through the coolant/process heat exchanger, is captured for the co-generation client use by counter flowing process/utility water flowing through the coolant/process heat exchanger. Thermal regulating valves can be used to regulate process/utility water temperature to insure appropriate water temperature delivery to the co-generation use.

In accordance with one aspect of the invention, an exhaust heat recovery silencer 56, further cools the exhaust from the engine block 12 and communicates through client absorption chiller 58 by means of conduit 60 and return conduit 62, as will be further described below in reference to FIG. 5.

Figure 4:
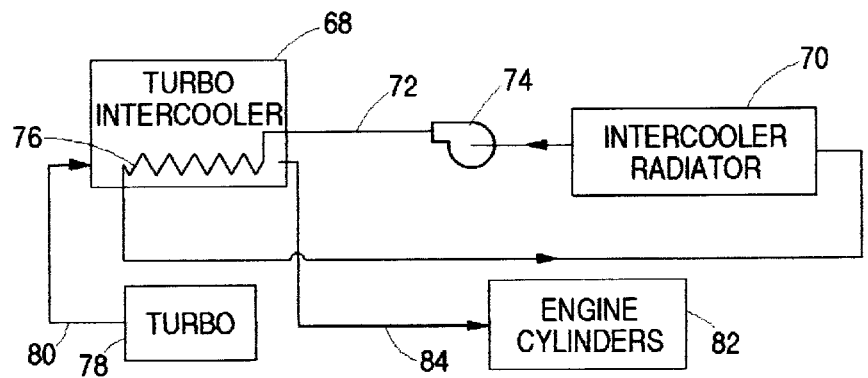
FIG. 4 is a flow chart of the turbocharger intercooler loop with turbo charged intake gas interface in accordance with the instant invention; and, FIG. 5 is a flow chart detail of the interface of the turbocharger intercooler radiator loop interface with the engine intake gas system and the engine exhaust system including the exhaust recycle in accordance with the instant invention.

Turning to FIG. 4, a turbo intercooler cooling circuit is shown and its interface with recycled exhaust gas, fuel, and air. Turbo intercooler cooling circuit comprises a turbo intercooler 68, which is cooled by coolant loop separate from coolant system 11 or process/utility heat system 13 and includes an intercooler radiator 70 fluidly communicating, via conduit 72 and pump 74, in a continuous closed circuit, through intercooler coil 76 of turbo intercooler 68. This fluid cooling system is dedicated to further reducing the inlet temperature of the compressed fuel/air/exhaust gas mixture from the turbocharger 78 as further explained below.

Figure 5:
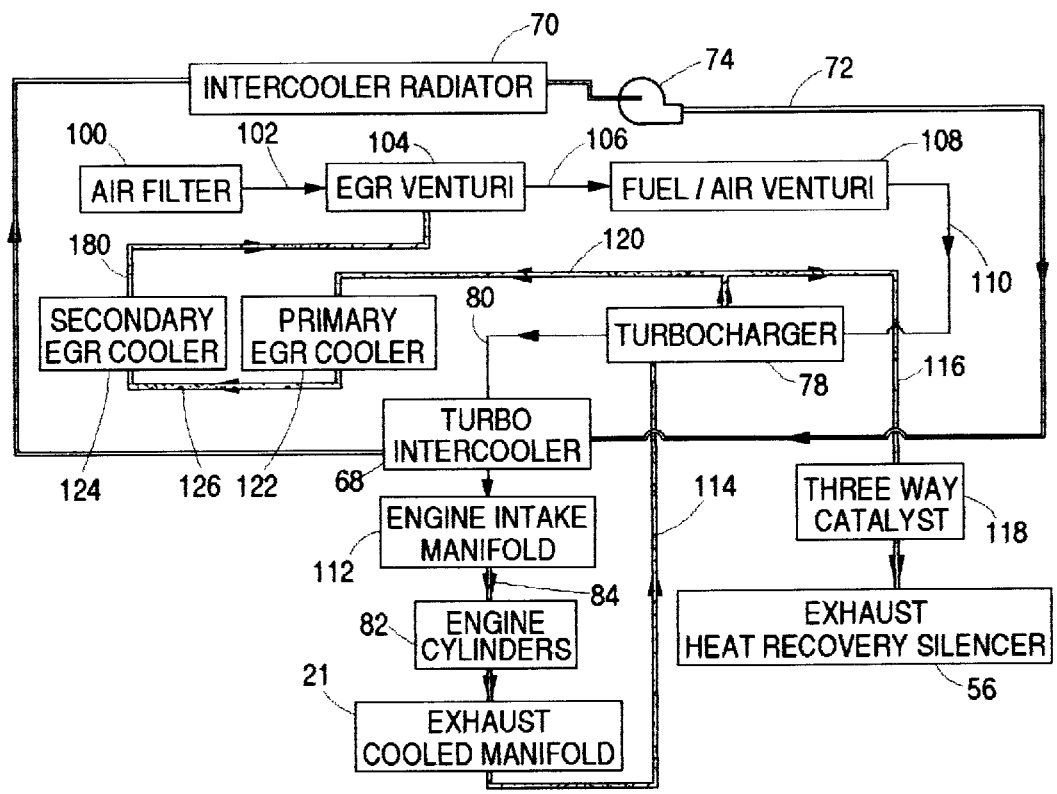

As better seen in FIG. 5, there are three operating systems associated with the intercooler radiator in accordance with the instant invention. FIG. 5 shows the interfaces between the turbo intercooler cooling circuit, the turbocharged, or compressed inlet gas mixture to the engine intake manifold and the recycled exhaust gas. This interaction is important in that head temperatures, gas inlet temperatures, and exhaust gas recycle temperatures can be tuned.

As seen in FIG. 5, intercooler radiator 70, pump 74, and conduit 72 continually circulate coolant, in a closed loop, through coil 76 of turbo intercooler 68 as previously described and shown in FIG. 4. Ambient outside air passes through air filter 100 and intake conduit 102 to EGR venturi 104, where air mixed with recycled exhaust gas from conduit 180 as will be more fully described. Mixed air and exhaust gas exists EGR venturi 104 through intake conduit 106 into fuel/air venturi 108 where the air exhaust gas mixture entrains fuel from a regulator (not shown). The fuel/air/exhaust gas mixture is compressed in turbocharger 78 via intake conduit 110. The compressed fuel/air/recycled exhaust gas mixture exists turbocharger 78 through intake conduit 80 into turbo cooler 68 where it is cooled from 400° F. to 165° F. The cooled intake gas exists turbo intercooler 68 into engine intake manifold 112 and into engine cylinders 82 via conduit 84. Exhaust gas from engine cylinders 82 exits into fluid cooled manifold 21 as previously described in FIG. 2 and enters turbocharger 78 through exhaust conduit 114 to power the turbocharger 78, thus compressing the fuel/air/recycled exhaust gas mixture entering turbocharger 78 by means of intake conduit 110 as previously described.

As can be seen, exhaust gas exiting turbocharger 78 is split into a recycled stream and an exhaust stream. The exhaust stream 116 enters three-way catalyst 118 and then exhaust heat recovery silencer 56 as previously described in connection with the description of FIG. 1. It will be realized, by one skilled in the art, that the exhaust heat recovery silencer 56 is on the co-generation process/utility heat system 13 and provides additional heat recovery for that system.

A portion of the exhaust gas to be recycled passes through conduit 120 to primary air cooled EGR cooler 122; and, if necessary, secondary air cooled EGR cooler 124 by means of conduit 126 and then passes into EGR venturi 104 through conduit 180 as previously described.

Thus, in accordance with the invention, ambient air (70° F.) flows through air filter to EGR venturi where it is mixed with up to 20% cooled exhaust gas (140° F.) at 100% load. The percent of recycled exhaust gas utilized is a function of engine load. This mixture (120° F.) then passes through the fuel/air venturi where fuel is drawn from a zero pressure gas regulator and mixed with the ambient air & exhaust gas to be flowed to the ambient side of the turbocharger. The fuel/air/recycle exhaust gas mixture is then pressurized by an exhaust gas-powered turbine to a pressure of 15 psig of at a temperature of (400° F.) This pressurized mixture passes through the turbocharger intercooler which reduces the pressurized and high temperature mixture to about 165° F. to be introduced into the intake manifold and then to the engine cylinders.

Following combustion, exhaust gas from the cylinders (1100° F.) passes through the coolant-cooled manifolds to recover heat, which reduces the exhaust gas temperature to about 940° F. The exit exhaust gas enters the exhaust (turbine driving section) of the turbocharger and, upon exiting, passes through a "T" with about 80% of the gas being flowed through a catalyst and a heat recovery silencer or muffler as previously described, and exhausted to atmosphere. A second portion comprising about 20% of the exhaust gas is passed through air coolers as previously described to the EGR venturi for introduction to the air/fuel intake system. The recycled exhaust gas is cooled by the air coolers to about 140° F. prior to admixing with air in the EGR venturi.

The foregoing discussions, and examples, describe only specific embodiments of the present invention. It should be understood that a number of changes might be made, without departing from its essence. In this regard, it is intended that such changes—to the extent that they achieve substantially the same result, in substantially the same way—would still fall within the scope and spirit of the present invention.

What is claimed is:

1. A heat transfer and cooling system for a natural gas fueled, internal combustion engine driven co-generation unit utilizing recycled exhaust gas comprising:

(a) a fluid system for cooling said internal combustion engine having a first loop containing a cooling fluid which fluidly communicates with the cooling ports of said internal combustion engine at a first inlet temperature and a first flow rate; and, a second loop containing a cooling fluid which fluidly communicates with cooling ports of at least one exhaust manifold of said internal combustion engine at a second inlet temperature and a second flow rate, wherein the cooling fluid exiting said first loop at a the first exit temperature and the cooling fluid exiting said second loop at the second exit temperature, converge in a confluence in at least one process heat exchanger; and (b) a co-generation process/utility heat loop containing a heat receiving medium in communication with said at least one process heat exchanger containing said confluence such that heat contained in said confluence from said cooling system is passed to the media of said co-generation process/utility heat loop.

2. The heat transfer and cooling system of claim 1 wherein said fluid system further comprises at least one dump/balance radiator in fluid communication with said at least one process heat exchanger to remove heat from said cooling fluid prior to the return of the cooling system fluid to said engine.

3. The heat transfer and cooling system of claim 1 wherein said fluid system further comprises an oil heat exchanger in fluid communication with an engine coolant pump on an oil heat exchanger inlet and is in fluid communication each one of said two loops on an oil heat exchanger outlet.

4. The heat transfer and cooling system of claim 1 wherein said fluid system further comprises a thermal control valve which fluidly communicates on an inlet side of said thermal control valve with said confluence and fluidly communicates on an outlet side of said thermal control valve with said at least one process heat exchanger or said oil heat exchanger depending on the temperature of said confluence.

5. The heat transfer and cooling system of claim 1 further comprising a turbo intercooler unit for cooling compressed air/recycle exhaust gas/fuel intake admixture prior to said admixture entering an engine intake manifold.

6. The heat transfer and cooling system of claim 5 wherein said turbo intercooler unit comprises a fluid coolant cooled intercooler coil for cooling a compressed air/recycle exhaust gas/fuel intake admixture, which is in liquid communication with an intercooler radiator for exhausting heat from said fluid coolant and a circulation pump for circulating said fluid coolant.

7. The heat transfer and cooling system of claim 1 further comprising at least one exhaust gas recycle cooler for cooling the recycled exhaust gas prior to forming an air/recycle exhaust gas/fuel intake admixture.

8. The heat transfer and cooling system of claim 7 wherein said at least one exhaust gas recycle cooler for cooling the recycled exhaust gas prior to forming an air/recycle exhaust gas/fuel intake admixture comprises two air cooled units in series.

9. The heat transfer and cooling system of claim 1 wherein said at least one exhaust manifold of said internal combustion engine comprises two exhaust manifolds, wherein a first manifold is in heat exchange communication with exhaust ports of said engine and the second manifold is in communication with exhaust exiting a turbocharger.

10. The heat transfer and cooling system of claim 1 wherein said co-generation process/utility heat loop further comprises a client absorption chiller in fluid communication with an exhaust heat recovery device such that non recycled engine exhaust is passed through said exhaust heat recovery device to transfer heat in the non recycled engine exhaust by way of the client absorption chiller to said co-generation process/utility heat loop.

11. A method for increasing the transfer of heat to a process/utility heat loop from a liquid cooling system for efficiently cooling a natural gas fueled, internal combustion engine utilizing recycled exhaust gas for driving a co-generation unit comprising:

(a) circulating a cooling fluid for cooling said internal combustion engine through a fist loop which fluidly communicates with cooling ports of said internal combustion engine at a first inlet temperature and at a first flow rate; and, through a second loop containing a cooling fluid which fluidly communicates with cooling ports of at least one exhaust manifold of said internal combustion engine at a second inlet temperature and at a second flow rate, such that the cooling fluid exiting said first loop at a first exit temperature and the cooling fluid exiting said second loop at a second exit temperature converge in a confluence in at least one heat exchangers; and (b) circulating a heat exchange media in a cooling a co-generation process/utility heat loop in communication with said at least one process heat exchanger containing said confluence from said cooling system such that so heat contained in said confluence from said cooling system is passed to the media of said co-generation process/utility heat loop.

12. The method of claim 11 wherein said cooling fluid is further passed though at least one dump/balance radiator in fluid communication with said at least one process heat exchanger to remove heat from said cooling system prior to the return of the cooling fluid to said engine.

13. The method of claim 11 wherein said cooling fluid is further passed though an oil heat exchanger in fluid communication with an engine coolant pump on the an oil heat exchanger inlet and is in fluid communication each one of said two loops on an oil heat exchanger outlet.

14. The method of claim 11 wherein said cooling fluid is further passed through a thermal control valve which fluidly communicates on an inlet side of said thermal control valve with said confluence and fluidly communicates on an outlet side of said thermal control valve with said at least one process heat exchanger or said oil heat exchanger depending on the temperature of said confluence.

15. The method of claim 11 comprising the further step of passing cooling fluid through a turbo intercooler third loop, which is not in liquid communication with said first or said second loop, for cooling the n compressed air/recycle exhaust gas/fuel intake admixture prior to said admixture entering an engine intake manifold.

16. The method of claim 15 wherein said turbo intercooler loop comprises a fluid coolant cooled intercooler coil for cooling compressed air/recycle exhaust gas/fuel intake admixture which is in liquid communication with an intercooler radiator for exhausting heat from said fluid coolant and a circulation pump for circulating said fluid coolant.

17. The method of claim 11 comprising the further step of cooling the recycled exhaust gas prior to forming an air/recycle exhaust gas/fuel intake admixture.

18. The method of claim 17 wherein said cooling step comprises passing said recycle exhaust gas through two air cooled units in series prior to forming said air/recycle exhaust gas/fuel intake admixture.

19. The method of claim 11 wherein said at least one exhaust manifold of said internal combustion engine comprises two exhaust manifolds, wherein a first manifold is in heat exchange communication with exhaust ports of said engine and the second manifold is in communication with exhaust exiting a turbocharger.

20. A heat transfer and cooling system for a natural gas fueled, internal combustion engine driven co-generation unit having a turbocharger and utilizing recycled exhaust gas comprising:

(a) a fluid cooling system for cooling said internal combustion engine having a cooling fluid, an engine coolant pump for flowing said cooling fluid through said fluid cooling system, an oil heat exchanger for removing heat from the engine oil in cooling fluid communication with an outlet of said engine coolant pump and an outlet cooling fluid communication each one of two loops wherein a first loop cooling fluidly communicates with cooling ports of said internal combustion engine at a first inlet temperature at a first flow rate; and, a second loop cooling fluidly communicates with an intake of a first exhaust manifold which is in heat exchange communication with engine exhaust ports and then a second exhaust manifold in heat exchange communication with exhaust exiting said turbocharger at a second inlet temperature at a second flow rate, wherein the cooling fluid exiting said first loop at a first exit temperature and a first flow rate and the cooling fluid exiting said second loop at a second exit temperature and a second flow rate converge in a confluence at an inlet side of a thermal control valve which cooling fluidly communicates on an outlet side of said thermal control valve with at least one process heat exchanger or said oil heat exchanger depending on the temperature of said confluence and said at least one process heat exchanger fluidly communicates with at least one dump/balance radiator to remove heat from said cooling system prior to the return of the cooling system fluid to said engine;

(b) a co-generation process/utility heat loop containing a heat receiving medium in communication with said at least one process heat exchanger containing said confluence from said cooling system such that heat contained in said confluence from said cooling system is passed to the media of said co-generation process/utility heat loop;

(c) a turbo intercooler unit for cooling compressed air/recycle exhaust gas/fuel intake admixture prior to said admixture entering an engine intake manifold comprising a fluid coolant cooled intercooler coil for cooling said compressed air/recycle exhaust gas/fuel intake admixture which is in liquid communication with an intercooler radiator for exhausting heat from said fluid coolant and a circulation pump for circulating said fluid coolant;

(d) at least one exhaust gas recycle cooler for cooling the recycled exhaust gas prior to forming the compressed air/recycle exhaust gas/fuel intake admixture comprising two air cooled units in series, and (e) an absorption chiller in fluid communication with an exhaust heat recovery device such that non recycled engine exhaust is passed through said exhaust heat recovery device to transfer heat in the non recycled engine exhaust by way of the client absorption chiller to said co-generation process/utility heat loop.

\* \* \* \* \*